(12) United States Patent
Jiang-Häfner et al.

(10) Patent No.: US 10,931,114 B2
(45) Date of Patent: Feb. 23, 2021

(54) CONTROLLING A VOLTAGE SOURCE CONVERTER IN A DC SYSTEM

(71) Applicant: ABB Power Grids Switzerland AG, Baden (CH)

(72) Inventors: Ying Jiang-Häfner, Ludvika (SE); Adil Abdalrahman, Ludvika (SE); Per Holmberg, Ludvika (SE)

(73) Assignee: ABB POWER GRIDS SWITZERLAND AG, Baden (CH)

( * ) Notice: Subject to any disclaimer, the term of this patent is extended or adjusted under 35 U.S.C. 154(b) by 0 days.

(21) Appl. No.: 16/635,025

(22) PCT Filed: Aug. 3, 2017

(86) PCT No.: PCT/EP2017/069728
§ 371 (c)(1),
(2) Date: Jan. 29, 2020

(87) PCT Pub. No.: WO2019/024999
PCT Pub. Date: Feb. 7, 2019

(65) Prior Publication Data
US 2020/0251906 A1 Aug. 6, 2020

(51) Int. Cl.
*H02J 3/36* (2006.01)
*H02M 7/757* (2006.01)

(52) U.S. Cl.
CPC .......... *H02J 3/36* (2013.01); *H02M 7/7575* (2013.01); *H02J 2003/365* (2013.01); *H02M 7/757* (2013.01)

(58) Field of Classification Search
CPC .... H02J 3/36; H02J 2003/365; H02M 7/7575; H02M 7/757
See application file for complete search history.

(56) References Cited

U.S. PATENT DOCUMENTS

| 4,106,085 | A | | 8/1978 | Demarest et al. |
| 4,638,415 | A | * | 1/1987 | Neupauer ............... H02J 3/36 307/82 |

(Continued)

FOREIGN PATENT DOCUMENTS

| CN | 105656072 A | 6/2016 |
| CN | 106972519 A | 7/2017 |

(Continued)

OTHER PUBLICATIONS

International Preliminary Report on Patentability, issued in PCT/EP2017/069728, dated Jul. 9, 2019. International Search Report, issued in PCT/EP2017/069728, dated Apr. 4, 2018. Written Opinion of the International Searching Authority, issued in PCT/EP2017/069728, dated Apr. 4, 2018.

(Continued)

*Primary Examiner* — Kyle J Moody
(74) *Attorney, Agent, or Firm* — Slater Matsil, LLP

(57) ABSTRACT

A first voltage source converter and converter station including such a first voltage source converter, as well as a method and computer program product for controlling the first voltage source converter are disclosed. The first voltage source converter has a DC side for connection to a DC system, has an AC side for connection to an AC system and is interconnected with an AC side of a second voltage source converter, which has a DC side connected to the DC system. The first voltage source converter includes a number of converter valve pairs, each being connected to a corresponding AC phase of the AC system and a control unit controlling the converter valves to generate at least one AC waveform and to reduce oscillations between the converters.

20 Claims, 3 Drawing Sheets

(56) References Cited

U.S. PATENT DOCUMENTS

| | | | | |
|---|---|---|---|---|
| 5,677,852 A | * | 10/1997 | Juhlin | H02J 3/24 |
| | | | | 702/117 |
| 2009/0219737 A1 | * | 9/2009 | Bjorklund | H02J 3/36 |
| | | | | 363/35 |
| 2018/0076619 A1 | * | 3/2018 | Gupta | H02J 1/02 |

FOREIGN PATENT DOCUMENTS

| | | |
|---|---|---|
| EP | 2 036 181 A1 | 3/2009 |
| EP | 3 070 799 A1 | 9/2016 |
| WO | WO 2008/000626 A1 | 1/2008 |
| WO | WO 2015/155183 A1 | 10/2015 |

OTHER PUBLICATIONS

International Search Report, issued in PCT/EP2017/069728, dated Apr. 4, 2018.
Written Opinion of the International Searching Authority, issued in PCT/EP2017/069728, dated Apr. 4, 2018.

* cited by examiner

CONTROLLING A VOLTAGE SOURCE CONVERTER IN A DC SYSTEM

FIELD OF INVENTION

The present invention relates to a first voltage source converter and a converter station comprising the first voltage source converter as well as to a method and computer program product for controlling the first voltage source converter.

BACKGROUND

Voltage source converters are often used for converting between alternating current (AC) and Direct Current (DC), such as between three-phase AC and DC. A converter is then typically provided in a converter station and has a DC side connected to a DC system and an AC side connected to an AC system. The converter is then made up of a number of phase legs, one for each phase, where each phase leg comprises two phase arms, an upper and a lower phase arm. Each phase arm then comprises a corresponding converter valve, where the valves of a phase leg are together used for forming an AC waveshape.

The DC system may be a bipole DC system, i.e. a system comprising two DC poles; a positive pole and a negative pole. In this case the converter station comprises two converters; one having its DC side connected to the positive pole and another having its DC side connected to the negative pole. In this case both the converters may have their AC sides interconnected for instance via a common AC bus linking to or being a part of the AC system.

In some instances it is also important that the two converters of the converter station operate in a frequency and voltage control mode. When this is the case and they are connected to the same AC system, the two poles share the active power via a power frequency droop. They also share the AC voltage control via a voltage-reactive power droop.

The main advantage of operating both converters in the frequency and voltage control mode is that the two poles can automatically share the active power imbalance (between load and generation) during grid restoration, or active power generated by wind farms, thanks to the power frequency droop functionality.

However, when controlling both the converters in this control mode when they are interconnected on the AC side, there is a risk of oscillations between the two poles.

If for instance the converter station is a black starting station in which both converters operate in frequency and voltage control mode and being connected to a further supporting station via the DC system it is possible that the two converters start to oscillate against each other.

The invention is concerned with the problem of damping such oscillations between two converters connected to the same DC system and interconnected on the AC side.

Damping of oscillations in a controller using model predictive control is described in WO 2015/155183. However, the oscillations being damped in this document are oscillations caused by an electrical LCL filter connected between the AC side of a converter and an AC system.

SUMMARY OF THE INVENTION

The present invention is directed towards damping oscillations between a first and a second voltage source converter when the converters have interconnected AC sides and DC sides connected to a DC system.

This object is according to a first aspect of the present invention achieved through a first voltage source converter having a direct current, DC, side for connection to a DC system and having an alternating current, AC, side for connection to an AC system and for interconnection with an AC side of a second voltage source converter, the second voltage source converter having a DC side connected to the DC system and the first voltage source converter comprising:

a number of converter valve pairs, each pair being connected to a corresponding AC phase of the AC system, and a control unit operative to control the converter valves to generate at least one AC waveform and to reduce oscillations between the converters.

This object is according to a second aspect achieved through a converter station comprising a first voltage source converter having a direct current, DC, side for connection to a DC system and having an alternating current, AC, side for connection to an AC system and for interconnection with an AC side of a second voltage source converter, the second voltage source converter having a DC side for connection to the DC system, where the first voltage source converter is the first voltage source converter according to the first aspect.

The object is according to a third aspect achieved through a method of controlling a first voltage source converter having a direct current, DC, side connected to a DC system, having an alternating current, AC, side connected to an AC system and being interconnected with an AC side of a second voltage source converter, the second voltage source converter having a DC side connected to the DC system and the first voltage source converter comprising a number of converter valve pairs, each pair being connected to a corresponding AC phase of the AC system, the method being performed in a control unit of the first voltage source converter and comprising controlling the converter valves to generate at least one AC waveform and to reduce oscillations between the converters.

The object is according to a fourth aspect of the present invention achieved through a computer program product for controlling a first voltage source converter having a direct current, DC, side connected to a DC system, having an alternating current, AC, side connected to an AC system and being interconnected with an AC side of a second voltage source converter, the second voltage source converter having a DC side connected to the DC system and the first voltage source converter comprising a number of converter valve pairs, each pair being connected to a corresponding AC phase of the AC system, the computer program product comprising a data carrier with computer program code configured to cause a control unit of the first voltage source converter to control the converter valves to generate at least one AC waveforms and to reduce oscillations between the converters.

The first and second converters may provided in the same converter station in a bipole DC system or converters in different converter stations in a monopole DC system.

The present invention has a number of advantages. It enables efficient oscillations damping of power swings between the two converters. Moreover, as the damping is performed using control it is possible to avoid introducing potentially expensive components having losses, such as resistors. Resistors are also bulky and thus increase the footprint of the converter. The degree of damping may also be flexibly set. The control is also easily introduced in a converter through merely adding some software.

BRIEF DESCRIPTION OF THE DRAWINGS

The present invention will in the following be described with reference being made to the accompanying drawings, where FIG. 1 schematically shows two converter stations connected to separate AC systems and interconnected by a DC system, FIG. 2 schematically shows a first converter of a first of the converter stations, FIG. 3 schematically shows a control unit for controlling the first converter comprising a waveform control module and an active damping control module, FIG. 4 schematically shows a first variation of a d component control section of the active damping control module, FIG. 5 schematically shows a corresponding q component control section of the active damping control module, FIG. 6 schematically shows a second variation of the d component control section, and FIG. 7 schematically shows a computer program product in the form of a data carrier comprising computer program code for implementing the control unit.

DETAILED DESCRIPTION OF THE INVENTION

In the following, a detailed description of preferred embodiments of the invention will be given.

Figure 1:
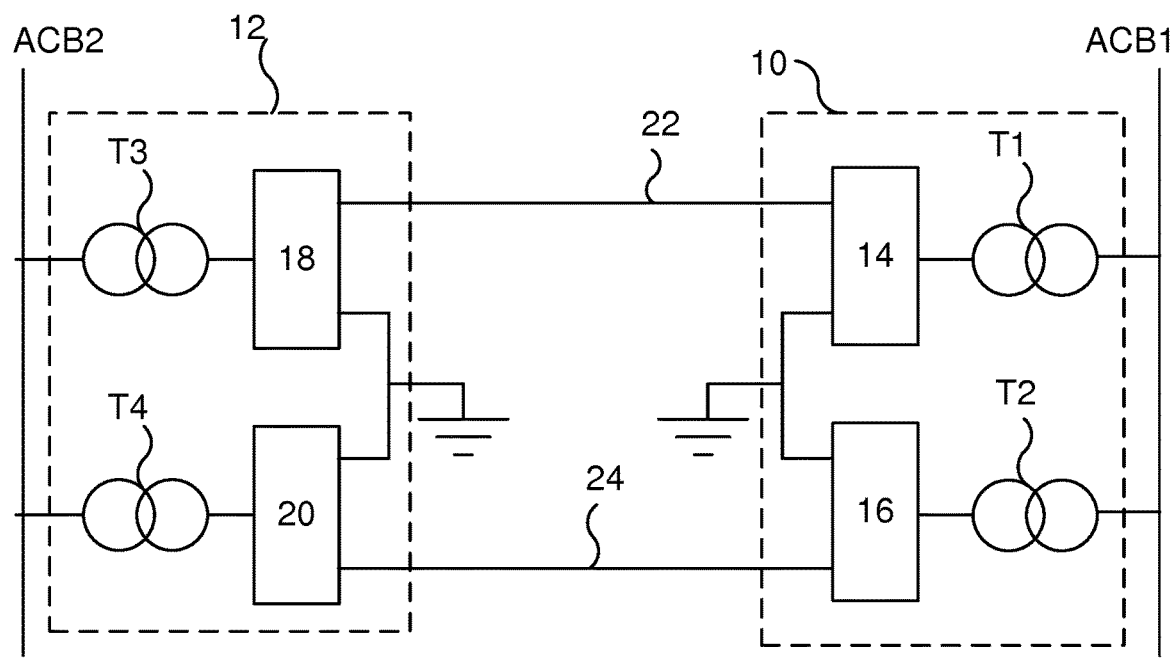

FIG. 1 shows a single line diagram of two converter stations 10 and 12, each connected to a separate Alternating Current (AC) system and being interconnected by a Direct Current (DC) system, which may be a High Voltage Direct Current (HVDC) power transmission system. The DC system is a bipole system and therefore there is a first pole 22 and a second pole 24. For this reason also the first converter station 10 comprises a first and second converter 14 and 16 and the second converter station 12 comprises a third and a fourth converter 18 and 20. The converters convert between AC and DC and therefore each converter has a DC side facing the DC system and an AC side facing an AC system.

In the present example the first converter 14 of the first converter station 10 is connected to a first AC bus ACB1 via a first transformer T1 and the second converter 16 is also connected to the first AC bus ACB1 via a second transformer T2, where the first AC bus ACB1 may be a part of or considered to be a first AC system. It can be seen that because of this, the AC sides of the first and the second converters 14 and 16 are interconnected via the first and second transformers T1 and T2 and the first AC bus ACB1.

In a similar manner, the third converter 18 of the second converter station 12 is connected to a second AC bus ACB2 via a third transformer T3 and the fourth converter 20 is connected to the second AC bus ACB2 via a fourth transformer T4, where the second AC bus ACB2 may be a part of or considered to be a second AC system.

The first converter 14 is also on the DC side connected to the third converter 18 via the first pole 22 and the second converter 16 is connected to the fourth converter 20 via the second pole 24, where the first and second poles 22 and 24 may be realized as cables, such as subsea or submarine cables, or overhead lines. Moreover, the first converter 14 is also interconnected with the second converter 16 on the DC side, where this interconnection is grounded, typically via an electrode line and a grounding electrode. In a similar manner the third converter 18 is interconnected with the fourth converter 20 on the DC side, where also this interconnection is grounded, for instance via an electrode line and a grounding electrode.

As an example the second AC system may be a system where energy is generated, and the first AC system may be a system where energy is consumed. The AC power systems may also be three-phase systems.

The poles 22 and 24 may also cover long distances for transferring power. The DC system is here a point-to-point bipole DC system interconnecting two converter station. It should be realized that as an alternative it could be a multi-terminal DC system, like a multi-terminal HVDC system, comprising more converter stations. It is also possible that the DC system is a monopole HVDC system, in which case the first and second converter may be provided in different converter stations but still be interconnected on the AC side.

Figure 2:
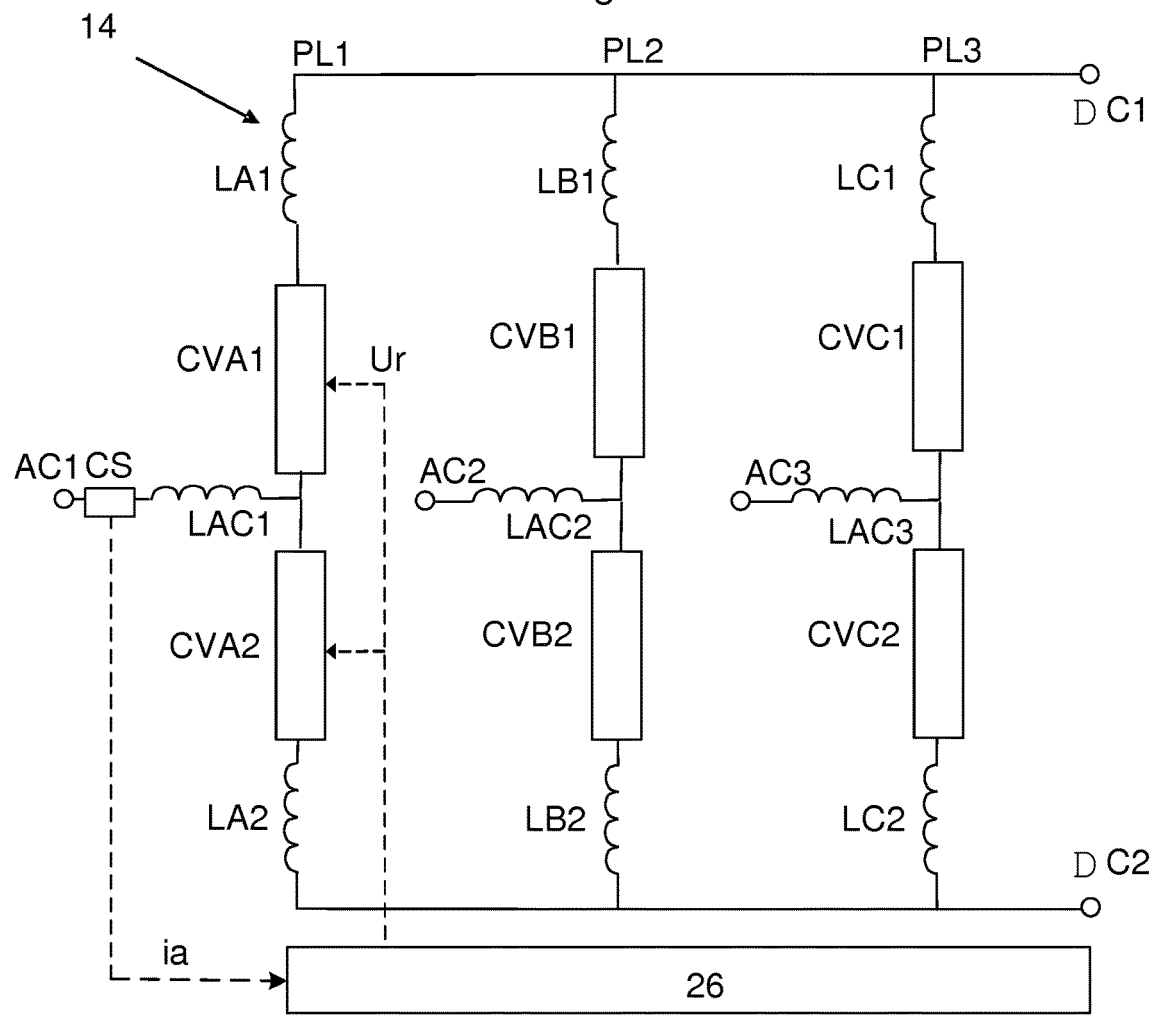

FIG. 2 shows one way of realizing the first converter 14. The exemplifying first converter 14 is a three-phase voltage source converter for converting between AC and DC and has, as was described earlier, a DC side facing the DC system and an AC side facing the first AC system. The first converter 14 therefore comprises three phase legs PL1, PL2 and PL3, for instance connected in parallel between a first and a second DC terminal DC1 and DC2, where the first DC terminal DC1 may be connected to the first pole 22 and the second DC terminal may be connected to a first DC terminal of the second converter 16, in which case a second DC terminal of the second converter 16 would be connected to the second pole 24. As is also mentioned earlier the interconnection between the second DC terminal DC2 of the first converter 14 and the first DC terminal of the second converter may in this case also be grounded.

Each phase leg of the first converter 14 furthermore comprises a pair of converter valves. The first phase leg PL1 therefore comprises a first and a second converter valve CVA1 and CVA2, the second phase leg comprises a third and a fourth converter valve CVB1 and CVB2 and the third phase leg PL3 comprises a fifth and a sixth converter valve CVC1 and CVC2. The mid points of the phase legs are connected to corresponding AC terminals AC1, AC2, AC3, where each AC terminal is connected to a corresponding phase of the first AC system via the first transformer (not shown). A phase leg is in this example divided into two halves, a first upper half and a second lower half, where such a half is also termed a phase arm. Thereby the phase legs are connected to the phases of the first AC system via the first transformer T1. Moreover each valve pair is connect to a corresponding AC phase of the first AC system.

A phase arm between the first DC terminal DC1 and a first, second or third AC terminal AC1, AC2 and AC3 may be termed a first phase arm or an upper phase arm, while a phase arm between the first, second or third AC terminal AC1, AC2 and AC3 and the second DC terminal DC2 may be termed a second phase arm or a lower phase arm. The phase arm midpoints are furthermore connected to the AC terminals via phase reactors LAC1, LAC2 and LAC3.

Moreover, the upper phase arms are joined to the first DC terminal DC1 via a corresponding first or upper arm reactor LA1, LB1 and LC1, while the lower phase arms are joined to the second DC terminal DC2 via a second or lower arm reactor LA2, LB2 and LC2. The arm reactors are thus connected between a valve and a pole. It should however be realized that arm reactors may just as well be provided on the opposite side of the valves.

The first voltage source converter 14 may be a two-level converter, where each converter valve is made up of a number of series connected switching units. Alternatively the converter may be a modular multilevel converter (MMC) where each converter valve is formed through a series-connection or cascade of a number of submodules, where a submodule may be a half-bridge submodule or a full-bridge submodule. A submodule then comprises one or two strings of series connected switching units in parallel with an energy storage element like a capacitor. A switching unit may be realized in the form a transistor with anti-parallel diode. However, it is also known to be realized using other types of semiconducting units, such as integrated gate-commutated thyristors (IGCTs) or Bi-mode Insulated Gate Transistors (BIGTs). It is also known with other types of submodules, such as submodules providing more than one voltage level.

Although an MMC is preferred, it should be realized that there exist countless variations of voltage source converters, where a converter may for instance be an n-level converter, such as a neutral point clamped three-level converter. Also a modular multilevel converter may be made up of a number of different types of submodules. There may also exits hybrid converters that use submodules in an n-level environment.

In the first converter 14 there is also a current sensor at each AC terminal. Each AC terminal is thus connected in series with a corresponding current sensor that detects or senses the phase current is running through the AC terminal. In FIG. 2 only one such current sensor CS connected between the first AC terminal AC1 and the first phase reactor LAC1 of the first phase leg PL1 is shown.

It should also be realized that as an alternative it is possible that pairs of current sensors are instead used, where one current sensor in a pair is provided in the upper phase arm of a phase leg and the other current sensor in the pair is provided in the lower phase arm of the same phase leg.

There is finally a control unit 26, which controls the operation of the first converter 14 and more particularly controls each converter valve. In the figure only the control of the first and second convert valves CVA1 and CVA2 using a valve control signal Ur is indicated. However, the control unit 26 is provided for controlling all the phase arms of the converter. It should thus be realized that all converter valves are controlled by the control unit 26.

Figure 3:
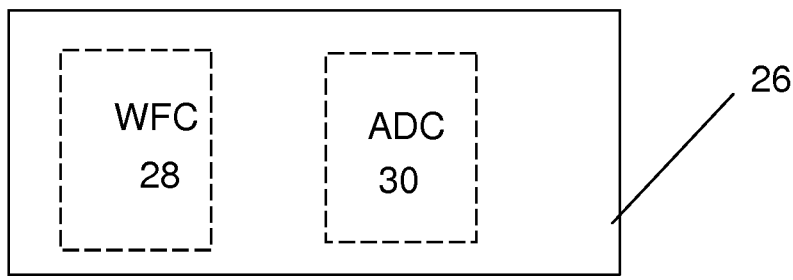

FIG. 3 shows a block schematic of one way of realizing the control unit 26. The control unit 26 comprises a waveform control module WFC 28 and an active damping control module ADC 30, where the waveform control module 28 is responsible for AC waveform generation and the active damping control module 30 is responsible for damping of oscillations between the first and the second converter. It can thereby be seen that the control unit controls the converter valves to generate at least one AC waveform and to reduce oscillations between the converters, which oscillations may be caused by resonances in the DC system. In the generation of the AC waveform the waveform control unit more particularly uses voltage and frequency control.

The second converter 16 may have the same realization as the first converter 14.

In HVDC Bipolar configuration, the two converters in the same converter station can operate in frequency and voltage control mode (FVCtrl). This may as an example be the case when the HVDC link formed by the two poles 22 and 24 is used to black start a dead AC system or to transmit the power generated from remote/offshore windfarms to a main AC grid, where the dead AC system as well as the main AC grid would correspond to the first AC system ACB1.

When the two converters in the same station operate in the FVCtrl mode and they are connected to or interconnected via the same AC system, the two poles share the active power via a power frequency droop. They also share the AC voltage control via a voltage-reactive power droop.

The main advantage of operating both converters in FVCtrl is that the two poles can automatically share an active power imbalance (between load and generation) during grid restoration, or active power generated by wind farms, thanks to the power frequency droop functionality.

Operating both converters in FVCtrl is a robust and straightforward type of operation that is often preferred.

However, when both converters of a converter station are operated in the FVCtrl mode there is a risk of oscillation between the two poles.

For the example in FIG. 1, the second converter station 12 may be a supporting station controlling the DC voltage and may be connected to an AC system represented by an infinite source (the second AC system ACB2), while the first converter station 10 is a black starting station in which both converters 14 and 16 operate in FVCtrl mode.

In a black start using a converter station, like the first converter station 10, where both converters are controlled using voltage and frequency control, the two poles may oscillate against one another, where it is as an example possible that the frequency of oscillation is between 1 and a few hundred Hz.

The total power exchanged between the first AC system and the DC system, may in this case be a more or less constant power without any oscillations. Therefore any oscillations observed in the output AC voltages of the first and second converters 14 and 16 would be oscillations occurring inside the HVDC system and between the two poles. The oscillations would thus be caused by resonances in the DC system. In fact, the DC side of an HVDC system has the potential to form resonance at a number of frequencies due to submodule capacitance, pole capacitance and the phase arm inductance as well as inductance in the pole with extremely low damping.

Aspects of the invention are therefore directed towards damping such oscillations between two converters.

How this may be done will now be described in relation to the first converter 14.

The waveform control module 28 of the control unit 26 controls the converter valves so that an AC waveform is generated on each AC terminal AC1, AC2, AC3, where the waveform on an AC terminal may in a known fashion be separated by 120 degrees from the waveforms on the other AC terminals. In this control it is possible that the waveform control module 28 is operating in FVCtrl mode and when operating in this mode it may also perform pulse width modulation control, such as Sinusoidal Pulse Width Modulation (SPWM) or 3 PWM. In doing this the converter valves of a phase leg, such as the first and second converter valves CVA1 and CVA2 of the first phase leg PL1, may receive a control signal representing a voltage level that it is desired to output. A valve may thus receive a valve control signal Ur that reflects a desired voltage and frequency to be output on the first AC terminal AC1 of the first converter 14.

However, as was mentioned above, when such control is performed by both the first and the second converter 14 and 16, oscillations may be caused to be generated between the two poles, which it may be desirable to dampen. Increasing the damping to resonance can be either realized by adding physical components such as resistors in the main circuit or by advanced control. It is costly to add any physical components such as resistors in the main circuit. These are also subject to losses and space demanding, which is also often undesirable, for instance in windfarm applications. According to aspects of the invention a control method for damping the oscillation between the poles is therefore used.

This damping is implemented through the use of the active damping control module 30. The active damping performed may be seen as the creation of a resistive voltage drop based on the phase current ia output from the converter, which voltage drop is provided in series with a voltage desired to be generated by the converter and may be resistive. This means that the active damping control module 30 may be seen as creating a virtual impedance, for instance a virtual resistance around any resonance frequencies formed between the two converters.

Now a first way of damping such oscillations will be described with reference also being made to FIG. 4 and FIG. 5.

The damping is performed during the control of the valves. Therefore the description will be given in relation to the control of the first and the second valve CVA1 and CVA2 of the first phase leg PL1. The same type of damping will take place also in respect of the second valve CVA2 of the first phase leg PL1 as well as in respect of the valves of the second and third phase legs PL2 and PL3.

In this first way of damping, oscillations damping and control is performed in the dq frame and therefore the active damping control module 30 comprises a d component control section and a q component control section.

Figure 4:
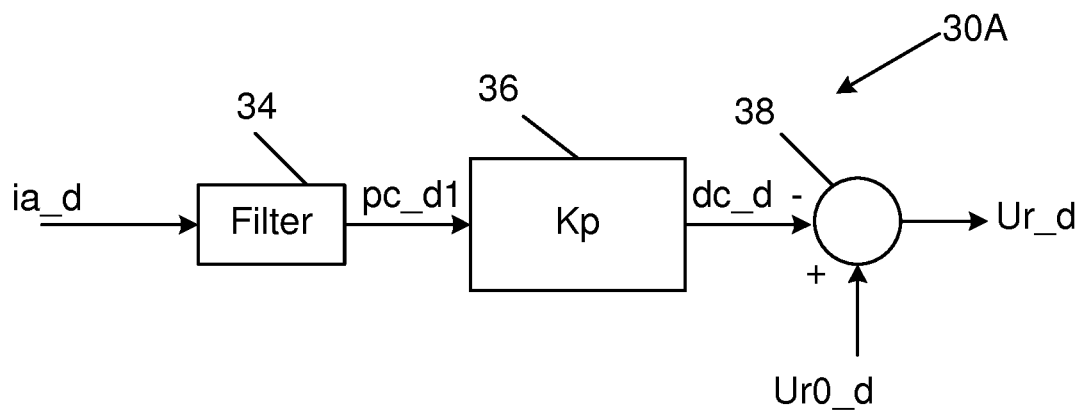
Figure 5:
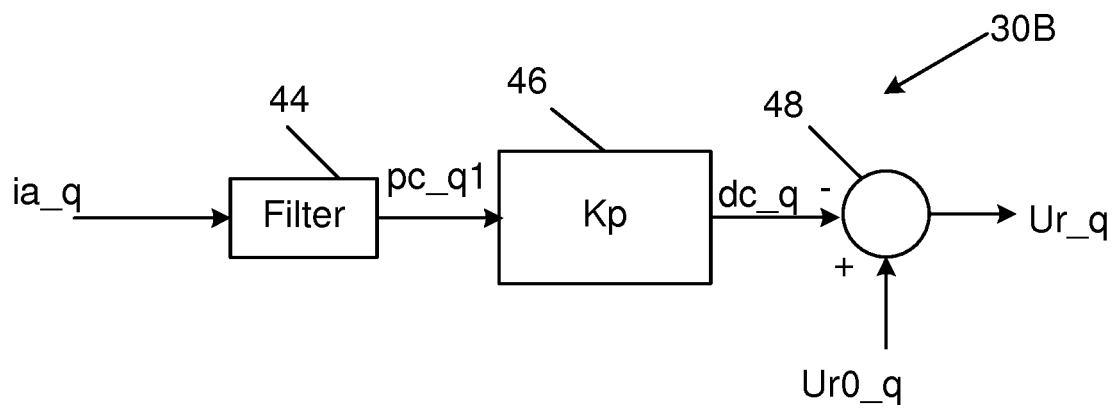

FIG. 4 schematically shows a first variation of a d component control section 30A of the active damping control module 30 and FIG. 5 shows a corresponding first realization of a q component control section 30B of the active damping control module 30. As the oscillations damping involves the creation of a virtual resistance, it involves the use of sensed phase currents in order to obtain the virtual voltage drop. Moreover, as the operation is performed in the dq frame, it may be necessary to transform the sensed phase current ia into a d component phase current ia_d and a q component phase current ia_q.

How this may be done is known in the art. However, in order to provide a better understanding a short description is also given below.

The phase current ia may be transformed from an abc or static frame into a dq frame where d denotes direct and q denotes quadrature. There is thus a transforming from an abc frame to a direct and quadrature frame. The transforming may involve creating an imaginary signal by shifting the original phase current signal ia by 90 degrees and this together with the original signal form alpha-beta waveforms, where the non-shifted waveform is the alpha waveform and the shifted waveform is the beta waveform.

The alpha waveform is multiplied with cos θ, while the beta waveform is multiplied with sin θ and added together in order to obtain the d component ia_d. In a similar manner, the alpha waveform is multiplied with sin θ, while the beta waveform is multiplied with cos θ in order to obtain the q component ia_q, were θ is a suitable angle such as the phase angle.

After the d and q phase currents ia_d and ia_q have been obtained these are then handled in the d and q component control sections 30A and 30B.

The handling first of all involves processing the phase current so that a main power frequency component is excluded from a following operation, where the main power frequency component is the fundamental frequency component of the AC voltage output by the converter. In this example the processing involves high pass filtering the phase current so that the component is blocked.

Therefore, as can be seen in FIG. 4, the direct component of the phase current ia_d is provided to a first filter 34 that has a first cut off frequency. The first filter is a high pass filter that high pass filters the d component using the first cut off frequency and provides it as a first d component processed current signal pc_d1. The following operation of the handling from which the main power frequency component is excluded comprises multiplying the phase current with a proportional gain Kp. Therefore the first filter 34 provides the processed current signal pc_d to a first controller 36. The first controller 36 is a P controller performing proportional control with a gain Kp with respect to the processed current signal pc_d1 in order to obtain an oscillations damping control signal dc_d representing the d component of the virtual voltage drop. The first controller 36 thus applies proportional control on the filtered phase current in order to obtain the d component of the oscillations damping control signal dc_d.

The same type of handling is also performed for the q component. Therefore, as can be seen in FIG. 5, the q component of the phase current ia_q is provided to a second filter 44 that has a corresponding first cut off frequency. The second filter 44 high pass filters the q component using the first cut off frequency for obtaining a first q component processed current signal pc_q1 that is provided to a second controller 46. The second controller 46 is also a P controller performing proportional control with a gain Kp with respect to the processed current signal pc_q1 in order to obtain an oscillations damping control signal dc_q representing the q component of the virtual voltage drop. The second controller 46 thus applies proportional control on the filtered phase current in order to obtain the oscillations damping control signal dc_q.

It can thereby be seen that the processing in the form of high pass filtering and proportional control is performed on both the d and q components of the phase current. It can furthermore be seen that the control is performed on both the q and d representations of the filtered phase current.

The damping control signals dc_d and dc_q may with advantage be combined with the waveform control of the phase legs and therefore the damping control signals may be in the form of voltages, which may then be combined with a control signal used by the waveform control module for controlling a phase arm. The damping control signal may as an example be subtracted from the arm modulation indices, i.e. the different waveform control signals or converter reference voltages formed by the waveform control module 28 for use in the control of the converter valves of a phase leg for providing a waveform. The oscillations damping control signal may thus be combined with the converter reference voltage in order to obtain the valve control signal.

How such converter reference voltages may be formed for the dq frame is for instance described in EP 2036181, which is herein incorporated by reference.

The waveform control module 28 may thus already operate in the dq frame, which means that it may already have waveform references or converter reference voltages Uro_d and Uro_q in the dq frame, in which case the d component damping control signal dc_d may be simply subtracted from this d component reference voltage Uro_d and the q component damping control signal dc_q may be subtracted from the q component reference voltage Uro_q in order to obtain a valve control signals comprising the voltage drop. As the damping control signals are negative, this adding will result in a voltage drop.

Therefore, as can be seen in FIG. 4, the d component damping control signal dc_d is supplied to a first negative input terminal of a first subtracting element 38, where the first subtracting element 38 has a second positive input terminal on which it receives a converter reference voltage Uro_d, often termed modulation index, used in the upper phase arm of the first phase leg. As mentioned above, the converter reference voltage Uro_d is generated by the waveforming control module 28. The first subtracting element 38 then subtracts the damping control signal from the converter reference voltage in order to obtain a d component valve control signal Ur_d for controlling the valves of the first phase leg.

As can be seen in FIG. 5, in a similar manner the q component damping control signal dc_q is supplied to a first negative input terminal of a second subtracting element 48, where the second subtracting element 48 has a second positive input terminal on which it receives a q component converter reference voltage Uro_q used in the upper phase arm of the second phase leg. Also this converter reference voltage Uro_q is generated by the waveforming control module 28. The second subtracting element 48 subtracts the damping control signal from the converter reference voltage in order to obtain a q component valve control signal Ur_q for controlling the valves of the first phase leg.

The two damping control signals Ur_d and Ur_q may then be used by the waveform control module 28 for supplying a valve control signal Ur in the abc or normal static frame to the valves CVA1 and CV2.

It can here be mentioned that it is possible that the converter reference voltage is already provided in the normal static frame, i.e. that there is only one converter forming reference voltage Uro. In this case it may be necessary to convert the damping control signal components dc_d and dc_q. The damping control signal components may more particularly be converted back to the originally used static frame through inversely transforming the dq components. This is the reverse process compared to the previous discussed dq transforming. The inverse transforming may thus involve transformation from the dq to the alfa-beta frame and from the alfa-beta frame to the static frame. Through this reverse process one damping control signal in the static frame is obtained, which damping control signal may then be combined with a converter reference voltage in the static frame in order to obtain the valve control signal Ur.

The damping control signal may thus be combined with the arm modulation index, i.e. the converter reference voltage used by the waveform control module 28.

Another possible variation is that the valve currents in the upper and lower valves of a phase arm are measured instead of the phase current. A phase current may then be formed as the difference between the two measured valve currents. The phase current may thereafter be transformed into the dq frame and handled in the previously described manner.

The above described filters may have the same or different settings and may have cut-off frequencies in the range 1-70 Hz, so that the fundamental component of the static frame AC voltage, which in the dq frame corresponds to a DC component, is removed from the proportional control.

As was stated above oscillations may generally occur in the range 1-a few hundred Hz. It can be seen that through the processing excluding a main power frequency component corresponding to the DC component in the dq frame together with a proportional control any oscillations in the arm current will be effectively damped. Thereby also power swings between the two converters will be dampened. Moreover, as the damping is performed using control it is possible to avoid introducing potentially expensive, bulky and lossy components such as resistors. The degree of damping may also be flexibly set using different values of the proportional gain. The control is also easily introduced in a converter through merely adding some software.

There are a number of further variations that may be made to the above-described control.

One variation is that more than one filtering of the phase current may be performed in the control.

Figure 6:
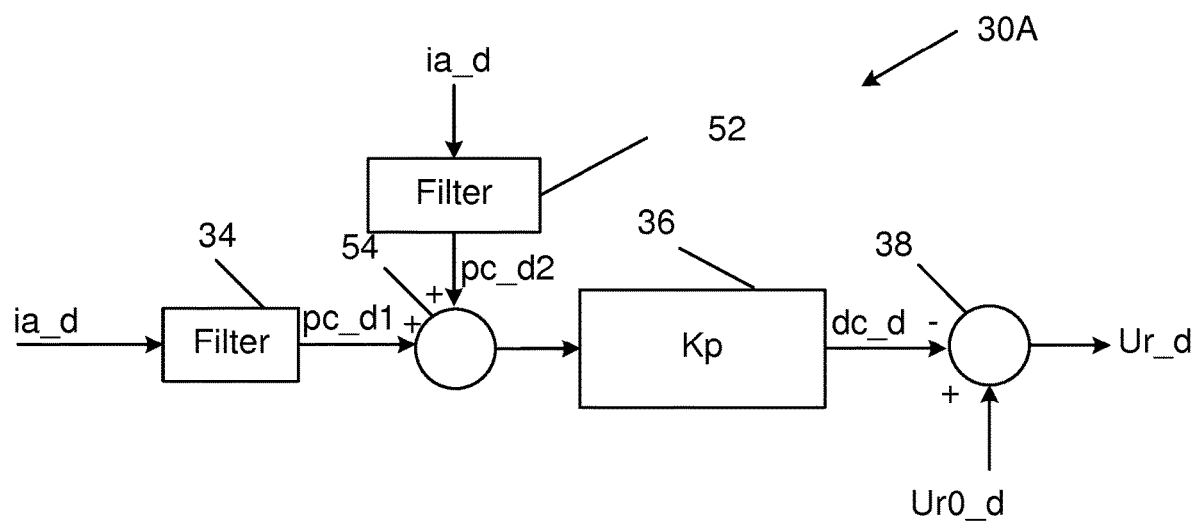

One example of this for the d component is shown in FIG. 6.

In FIG. 6 there is the first high pass filter 34 that receives and high pass filters the d component ia_d of the phase current and provides a first processed current signal pc_d1, just as in FIG. 4. However the first processed current signal pc_d1 is in this case provided to a first input terminal of an adding element 54. There is also a further high-pass filter 52 having a second cut-off frequency. The second filter 50 receives the d component ia_d of the phase current and high pass filters it using the second cut-off frequency. The filter 50 then provides the high pass filtered current as a second processed current signal pc_d2. The second processed current signal pc_d2 is therefore supplied to a second input terminal of the adding element 54, which forms a sum of the two processed current signals and provides the sum to the first controller 36. Thereafter proportional control and combination with reference voltage is made in the same was as was described above in relation to in FIG. 4.

The filters may here be set differently. The first filter may have a first cut-off frequency while the further filter may have a second cut-off frequency, where both may lie in the above described range of 1-70 Hz. It is here also possible that one cut off-frequency may lie closer to a first end of the range and the other may lie closer to the opposite end of the range.

The same type of changes may also be made to the q component control module shown in FIG. 5.

This type of control may improve the damping even further.

In the variations described above, the damping control signal was generated in the dq frame. It should be realized that this is not necessary. The damping control signal may according to another variation be generated also in the static frame.

In this variation there is thus no transformation into the dq frame. Instead the phase current ia is directly processed for obtaining the first processed current signal. The processing may again involve high pass filtering. In this case the cut-off frequency is set differently than in the dq frame. It may as an example be set higher than the fundamental AC frequency. It may for instance be set higher than 50 or 60 Hz in order to remove the power frequency component.

The first and any other processed current signals, like a second processed current signal, are then supplied to a controller performing proportional and resonance control, which is thus a PR controller, where the resonance control may be performed at the fundamental frequency. The output of the controller may then be combined with the static frame reference voltage for obtaining a valve control signal, which is then used for controlling the converter valves of a phase leg.

It can in this way be seen that it is possible to implement the control without transformation to the dq frame and back, which increases the speed of the control.

The description was above made in relation to the first converter 14 and its control unit 26. It is possible that the second converter 16 has the same types of converter valves, current sensors and a control unit with the same type of control as the first converter. When the first and second converter are then both operated in the above described way an even more efficient damping of the oscillations between the converters may be obtained.

The description was also made for two converters operating with voltage and frequency control, i.e. in the FVCtrl mode. It is as an alternative possible that the same scheme is used for two converters operating in voltage and phase angle control, i.e. emulating synchronous machines. There are thus several control modes in which the converter may operate. However, the control mode used may need to be different from the customary current feedback control mode.

Figure 7:
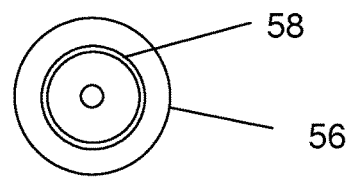

The above described control unit may be realized in the form of discrete components. However, it may also be implemented in the form of a processor with accompanying program memory comprising computer program code that performs the desired control functionality when being run on the processor. A computer program product carrying this code can be provided as a data carrier such as one or more CD ROM discs or one or more memory sticks carrying the computer program code, which performs the above-described control functionality when being loaded into a control unit of a voltage source converter. One such data carrier in the form of a CD Rom disk 56 carrying computer program code 58 is shown in FIG. 7.

From the foregoing discussion it is evident that the present invention can be varied in a multitude of ways. It shall consequently be realized that the present invention is only to be limited by the following claims.

The invention claimed is:

1. A first voltage source converter having a direct current (DC) side for connection to a DC system and having an alternating current (AC) side for connection to an AC system and for interconnection with an AC side of a second voltage source converter, said second voltage source converter having a DC side connected to the DC system and the first voltage source converter comprising:
   a number of converter valve pairs, each pair being connected to a corresponding AC phase of the AC system; and
   a control unit operative to control the converter valve pairs to generate at least one voltage waveform and the control unit when reducing oscillations is configured to create a virtual resistance around a resonance frequency formed between the first voltage source converter and the second voltage source converter,
   wherein the control unit when forming the virtual resistance is operative to multiply a phase current with a proportional gain for obtaining an oscillations damping control signal, reducing oscillations between the first voltage source converter and the second voltage source converter by combining the oscillations damping control signal with a converter reference voltage.

2. The first voltage source converter according to claim 1, wherein the control unit is further configured to process the phase current so that a main power frequency component is excluded from the multiplication.

3. The first voltage source converter according to claim 2, wherein the processing comprises high pass filtering the phase current.

4. The first voltage source converter according to claim 3, wherein a cut-off frequency of the high pass filtering is in a range of 1-70 Hz.

5. The first voltage source converter according to claim 4, wherein the control unit is further operative to combine the oscillations damping control signal with the converter reference voltage in order to obtain a valve control signal.

6. The first voltage source converter according to claim 3, wherein the control unit is further operative to combine the oscillations damping control signal with the converter reference voltage in order to obtain a valve control signal.

7. The first voltage source converter according to claim 2, wherein the control unit is further operative to combine the oscillations damping control signal with the converter reference voltage in order to obtain a valve control signal.

8. The first voltage source converter according to claim 1, wherein the control unit is further operative to combine the oscillations damping control signal with the converter reference voltage in order to obtain a valve control signal.

9. The first voltage source converter according to claim 8, wherein the control unit is operative to combine the oscillations damping control signal with the converter reference voltage in a dq frame.

10. The first voltage source converter according to claim 8, wherein the control unit is operative to combine the oscillations damping control signal with the converter reference voltage in a static frame.

11. The first voltage source converter according to claim 1, wherein the first voltage source converter is configured to operate in a different control mode than current feedback control.

12. The first voltage source converter according to claim 1, wherein the first voltage source converter is configured to operate in a voltage and frequency or in a voltage and phase control mode.

13. A converter station comprising the first voltage source converter according to claim 1.

14. The converter station according to claim 13, further comprising the second voltage source converter.

15. A method of controlling a first voltage source converter having a direct current (DC) side connected to a DC system, having an alternating current (AC) side connected to an AC system and being interconnected with an AC side of a second voltage source converter, said second voltage source converter having a DC side connected to the DC system and said first voltage source converter comprising a number of converter valve pairs, each pair being connected to a corresponding AC phase of the AC system, the method being performed in a control unit of the first voltage source converter and comprising:
   controlling the converter valve pairs to generate at least one voltage waveform;
   creating a virtual resistance around a resonance frequency formed between the first voltage source converter and the second voltage source converter, forming of the virtual resistance by multiplying a phase current with a proportional gain for obtaining an oscillations damping control signal; and
   reducing oscillations between the first voltage source converter and the second voltage source converter by combining the oscillations damping control signal with a converter reference voltage.

16. The method according to claim 15, wherein the forming of the virtual resistance further comprises processing the phase current so that a main power frequency component is excluded from the multiplication.

17. The method according to claim 16, wherein the processing comprises high pass filtering the phase current.

18. The method according to claim 15, further comprising combining the oscillations damping control signal with the converter reference voltage in order to obtain a valve control signal.

19. The method according to claim 18, wherein the oscillations damping control signal is combined with the converter reference voltage in a dq frame.

20. A computer program product for controlling a first voltage source converter having a direct current (DC) side connected to a DC system, having an alternating current (AC) side connected to an AC system and being interconnected with an AC side of a second voltage source converter, said second voltage source converter having a DC side connected to the DC system and said first voltage source converter comprising a number of converter valve pairs, each pair being connected to a corresponding AC phase of the AC system, the computer program product comprising a non-transitory data carrier with computer program code configured to cause a control unit of the first voltage source converter to:

control the converter valve pairs to generate at least one voltage waveform; and create a virtual resistance around a resonance frequency formed between the first voltage source converter and the second voltage source converter, forming of the virtual resistance by multiplying a phase current with a proportional gain for obtaining an oscillations damping control signal, reducing oscillations between the first voltage source converter and the second voltage source converter by combining the oscillations damping control signal with a converter reference voltage.

* * * * *